United States Patent
Tremaine et al.

(10) Patent No.: US 6,457,104 B1
(45) Date of Patent: Sep. 24, 2002

(54) SYSTEM AND METHOD FOR RECYCLING STALE MEMORY CONTENT IN COMPRESSED MEMORY SYSTEMS

(75) Inventors: R. Brett Tremaine, Stormville, NY (US); Michael Wazlowski, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/528,688

(22) Filed: Mar. 20, 2000

(51) Int. Cl.⁷ ............................................. G06F 12/00
(52) U.S. Cl. ..................... 711/133; 711/119; 711/130; 711/141; 711/146; 711/155; 711/159; 711/202; 711/206; 709/213
(58) Field of Search ................................ 711/133, 135, 711/155, 141, 144, 145, 117, 130, 119, 120, 147, 122, 159, 146, 206; 709/213, 214, 202

(56) References Cited

U.S. PATENT DOCUMENTS

| | | | | |
|---|---|---|---|---|
| 5,943,684 A | * | 8/1999 | Arimilli et al. | 711/144 |
| 6,148,375 A | * | 11/2000 | Baylor et al. | 711/130 |
| 6,192,451 B1 | * | 2/2001 | Arimilli et al. | 711/141 |
| 6,341,336 B1 | * | 1/2002 | Arimilli et al. | 711/144 |

* cited by examiner

Primary Examiner—Do Hyun Yoo
Assistant Examiner—Jasmine Song
(74) Attorney, Agent, or Firm—Scully, Scott, Murphy & Presser; Derek S. Jennings

(57) ABSTRACT

In a processing system having a main memory wherein information is stored in a compressed format for the purpose of gaining additional storage through compression efficiencies and, wherein information stored within the main memory is indirectly accessible by a processor through an uncompressed information cache, an improved memory architecture, apparatus and method for detecting and recovering the main memory space used to store "stale" information associated with cache lines in the "modified" state, and returning the storage to an unused pool for use in storing other information. This improves the overall compression rate of the system, thus lessening the likelihood of encountering a "memory pressure" situation where the system runs low on unused memory.

17 Claims, 3 Drawing Sheets

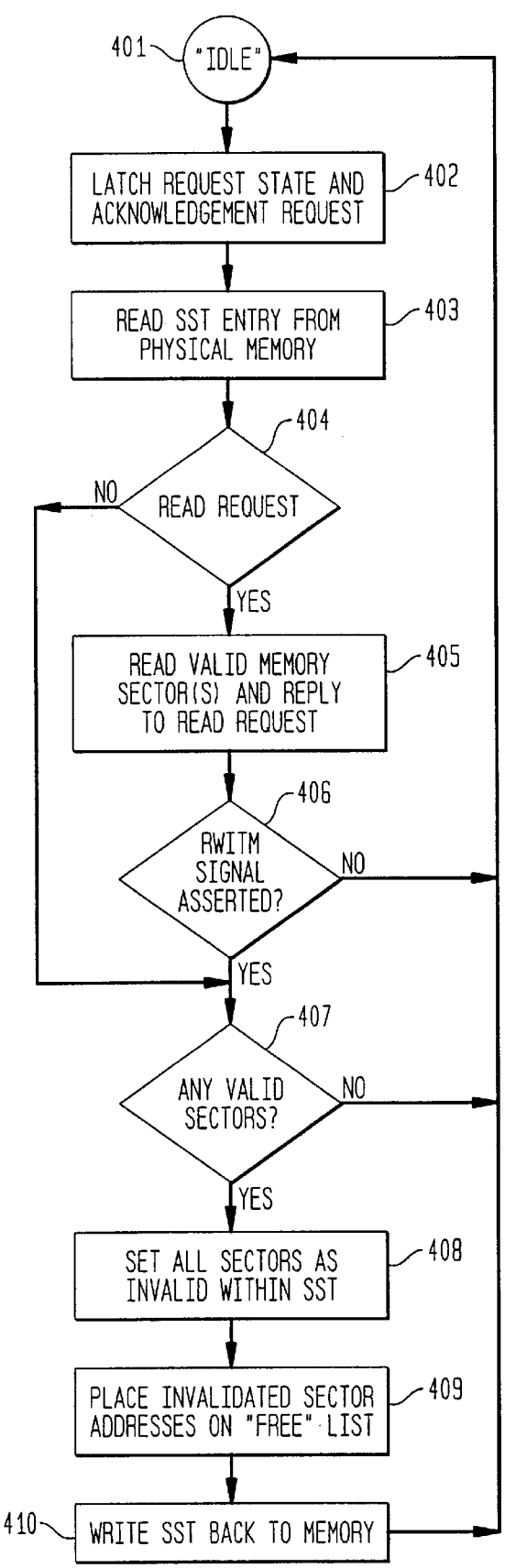

SYSTEM AND METHOD FOR RECYCLING STALE MEMORY CONTENT IN COMPRESSED MEMORY SYSTEMS

BACKGROUND OF THE INVENTION

1. Field of the Invention

This invention relates generally to the field of compressed memory architecture in computer systems, and more specifically to an improved method and apparatus for managing compressed main memory.

2. Discussion of the Prior Art

Computer systems generally consist of one or more processors that execute program instructions stored within a memory medium. This medium is most often constructed of the lowest cost per bit, yet slowest storage technology. To increase the processor performance, a higher speed, yet smaller and more costly memory, known as a cache memory, is placed between the processor and final storage to provide temporary storage of recent/and or frequently referenced information. As the difference between processor speed and access time of the final storage increases, more levels of cache memory are provided, each level backing the previous level to form a storage hierarchy. Each level of the cache is managed to maintain the information most useful to the processor. Often more than one cache memory will be employed at the same hierarchy level, for example when an independent cache is employed for each processor. Cache memory systems in computing devices have evolved into quite varied and sophisticated structures, but always they address the tradeoff between speed and both cost and complexity, while functioning to make the most useful information available to a processor as efficiently as possible. Typically only large "mainframe" computers employ memory hierarchies greater than three levels. However, systems are now being created using commodity microprocessors that benefit greatly from a third level of cache in the memory hierarchy. This level is best suited between the processor bus and the main memory, and being shared by all processors and in some cases the I/O system too, it is called a shared cache. Each level of memory requires several times more storage than the level it backs to be performance effective, therefore the shared cache requires several tens of megabytes of memory. To remain cost effective, the shared cache is implemented using low cost Dynamic Random Access Memory (DRAM), organized as a separate array or a portion of the system main memory.

Recently, cost reduced computer system architectures have been developed that more than double the effective size of the main memory by employing high speed compression/decompression hardware based on common compression algorithms, in the path of information flow to and from the main memory. Processor access to main memory within these systems is performed indirectly through the compressor and decompressor apparatuses, both of which add significantly to the processor access latency costs.

Referring now to FIG. 1, a block diagram of a prior art computer system 100 is shown. The computer system includes one or more processors 101 connected to a common shared memory controller 102 that provides access to a system main memory 103 through a shared cache 114. The shared memory controller contains a compressor device 104 for compressing fixed size information blocks into as small a unit as possible for ultimate storage into the main memory 103, a decompressor device 105 for reversing the compression operation after the stored information is later retrieved from the main memory, and a cache controller 115 for managing a cache memory to contain uncompressed information. The cache controller 115 is connected to the memory controller 106 through at least a read request 119 and read request address 120 to signal the memory controller to read a quantity of information from the main memory for placement in to the cache 114 via bus 117. Information may be transferred to the processor data bus 108 from the cache 114 through bus 117, or from the main memory 103, either through or around the decompressor 105 via a multiplexor 111. Similarly, information may be transferred to the cache from the main memory 103 from the processor data bus 108. Information may be transferred to the main memory 103 from the processor data bus 108 or cache 114, either through or around the compressor 104 via a multiplexor 112. The processor data bus 108 is used for transporting uncompressed information between other processors and/or the shared memory controller 102, and the shared cache 114.

The main memory 103 is typically constructed of dynamic random access memory (DRAM) with access controlled by a memory controller 106. Addresses appearing on the processor address bus 107 and cache address bus 116 are known as Real Addresses, and are understood and known to the programming environment. Addresses appearing on the main memory address bus 109 are known as Physical Addresses, and are used and relevant only between the memory controller and main memory DRAM. Memory Management Unit (MMU) hardware within the memory controller 106 is used to translate the real processor addresses to the virtual physical address space. This translation provides a means to allocate the physical memory in small increments for the purpose of efficiently storing and retrieving compressed and hence, variable size information.

The compressor 104 operates on a fixed size block of information, say 1024 bytes, by locating and replacing repeated byte strings within the block with a pointer to the first instance of a given string, and encoding the result according to a protocol. This process occurs through a byte-wise compare over a fixed length and is paced by a sequence counter, resulting in a constant completion time. The post process output block ranges from just a few bytes to the original block size, when the compressor could not sufficiently reduce the starting block size to warrant compressing at all. The decompressor 105 functions by reversing the compressor operation by decoding resultant compressor output block to reconstruct the original information block by inserting byte strings back into the block at the position indicated by the noted pointers. Even in the very best circumstances, the compressor is generally capable of only ¼–½ the data rate bandwidth of the surrounding system. The compression and decompression processes are naturally linear and serial too, implying quite lengthy memory access latencies through the hardware.

FIG. 2 depicts a prior art main memory partitioning scheme 200.

The main memory 205 is a logical entity because it includes the processor(s) information as well as all the required data structures necessary to access the information. The logical main memory 205 is physically partitioned from the physical memory address space 206. In many cases the main memory partition 205 is smaller than the available physical memory to provide a separate region to serve as a cache with either an integral directory, or one that is implemented externally 212. It should be noted that when implemented, the cache storage may be implemented as a region 201 of the physical memory 206, a managed quantity of uncompressed sectors, or as a separate storage array 114. In any case, when implemented, the cache controller requests accesses to the main memory in a similar manner as a processor would if the cache were not present.

The logical main memory 205 is partitioned into the sector translation table 202, with the remaining memory being allocated to sector storage 203 which may contain compressed or uncompressed information, free sector pointers, or any other information as long as it is organized into sectors. The sector translation table region size varies in proportion to the real address space size which is defined by a programmable register within the system. Particularly, equation 1) governs the translation of the sector translation table region size as follows:

$$sector\_translation\_table\_size = \frac{real\_memory\_size}{compression\_block\_size} \cdot translation\_table\_entry\_size \quad 1)$$

Each entry is directly mapped to a fixed address range in the processor's real address space, the request address being governed in accordance with equation 2) as follows:

$$STT\_entry\_address = \left(\left(\frac{real\_address}{compression\_block\_size}\right) \cdot translation\_table\_entry\_size\right) + offset\_size \quad 2)$$

For example, a mapping may employ a 16 byte translation table entry to relocate a 1024 byte real addressed compression block, allocated as a quantity 256 byte sectors, each located at the physical memory address indicated by a 25-bit pointer stored within the table entry. The entry also contains attribute bits 208 that indicate the number of sector pointers that are valid, size, and possibly other information. Every real address reference to the main memory causes the memory controller to reference the translation table entry 207 corresponding to the real address block containing the request address 210. For read requests, the MMU decodes the attribute bits 208, extracts the valid pointer(s) 209 and requests the memory controller to read the information located at the indicated sectors 204 from the main memory sectored region 203. Similarly, write requests result in the MMU and memory controller performing the same actions, except information is written to the main memory. However, if a write request requires more sectors than are already valid in the translation table entry, then additional sectors need to be assigned to the table entry before the write may commence. Sectors are generally allocated from a list of unused sectors that is dynamically maintained as a stack or linked list of pointers stored in unused sectors. There are many possible variations on this translation scheme, but all involve a region of main memory mapped as a sector translation table and a region of memory mapped as sectors. Storage of these data structures in the DRAM based main memory provides the highest performance at the lowest cost, as well as ease of reverting the memory system into a typical direct mapped memory without compression and translation.

Referring back to FIG. 1, the large high speed cache memory 114 is generally employed between the processor and the compressor/decompressor hardware to reduce the frequency of processor references to the compressed memory, mitigating the effects the high compression/decompression latency. The cache is partitioned into a number of cache lines, equal in size to the fixed information block size required by the compressor and decompressor. Each cache line contains an uncompressed copy of an equivalent block of information contained within the compressed main memory. Since the processor can only reference the cache contents, the duplicated information in the main memory represents a cost to the system, in terms of wasted space. As long as the contents of the cache line remain unmodified, this cost is balanced by the advantage of not having to copy the cache line contents back to the main memory, after a cache line is evicted from the cache. However, this advantage is lost when the cache line becomes modified with respect to the copy of information within the compressed main memory, as all modified cache lines must be written back to the main memory through the compressor. This implies that once a cache line becomes modified, the copy of information within the main memory becomes "stale" and wastes space.

It would thus be highly desirable to provide a data management technique for a compressed memory system that detects "stale" information in the main memory, and returns the space used to store such information to an unused sector pool to be used for storing other information.

It would further be highly desirable to provide a data management technique that improves the overall compression rate of the system, without significant cost or complexity, that reduces the likelihood of encountering a "memory pressure" situation where the system runs low on free sectors.

SUMMARY OF THE INVENTION

It is an object of the invention to provide a data management mechanism, within a compressed memory system operating with an uncompressed information cache, to maximize the compression efficiency and thus mitigate "memory pressure" situations where the system runs low on free sectors.

It is a further object of the invention to provide a method and apparatus to detect and recover the main memory space used to store "stale" information associated with cache lines in the "modified" state, and return the storage to an unused pool for use in storing other information.

According to the principles of the invention, there is provided a computer memory system implementing a processing device for enabling indirect storage and retrieval of compressed data in an available address space in a physical memory associated with the computer and issuing real memory addresses for accessing information from the physical memory, the system comprising:

a sectored storage region in said physical memory for exclusive storage of information in fixed length storage sectors;

a cache memory array device having a plurality of cache lines;

a cache directory device, associated with the cache memory array device, comprising entries for storing address tag information and modification state information associated with the data stored in the cache memory array;

a cache line replacement mechanism associated with the cache memory array, for performing a cache line fill operation by requesting and removing existing cache line data and replacing removed data with different data via a cache line replacement operation, and updating the directory device with new address tag information and modification state information; and, a cache memory access system for enabling access to the data in said physical memory by said processing device, the cache memory access system including a cache control mechanism for asserting signals associated with the cache line modification state information when a cache line is to be modified; and, a memory control device, responsive to the asserted modified state information signals for reallocating any sectors within the sectored storage region associated with the modified cache line as unused sectors available for subsequent data storage.

Particularly, the cache control mechanism device that has been modified to assert two independent control signals: 1) a "read-with-intent-to-modify" (RWITM); and, 2) "modify", to the main memory control device, for the purpose of indicating that a line in the cache is being set to the modified state. Both control signals cause a memory controller device to set the main memory storage sector requirement, noted within a sector translation table entry selected by cache line read request address signals, to zero, and release all storage sectors to a free storage sector pool.

BRIEF DESCRIPTION OF THE DRAWINGS

Further features, aspects and advantages of the apparatus and methods of the present invention will become better understood with regard to the following description, appended claims, and accompanying drawings where:

FIG. 4 is a state diagram illustrating the process for recycling stale compressed memory according to the principals of the present invention.

DETAILED DESCRIPTION OF THE PREFERRED EMBODIMENT

Figure 1:
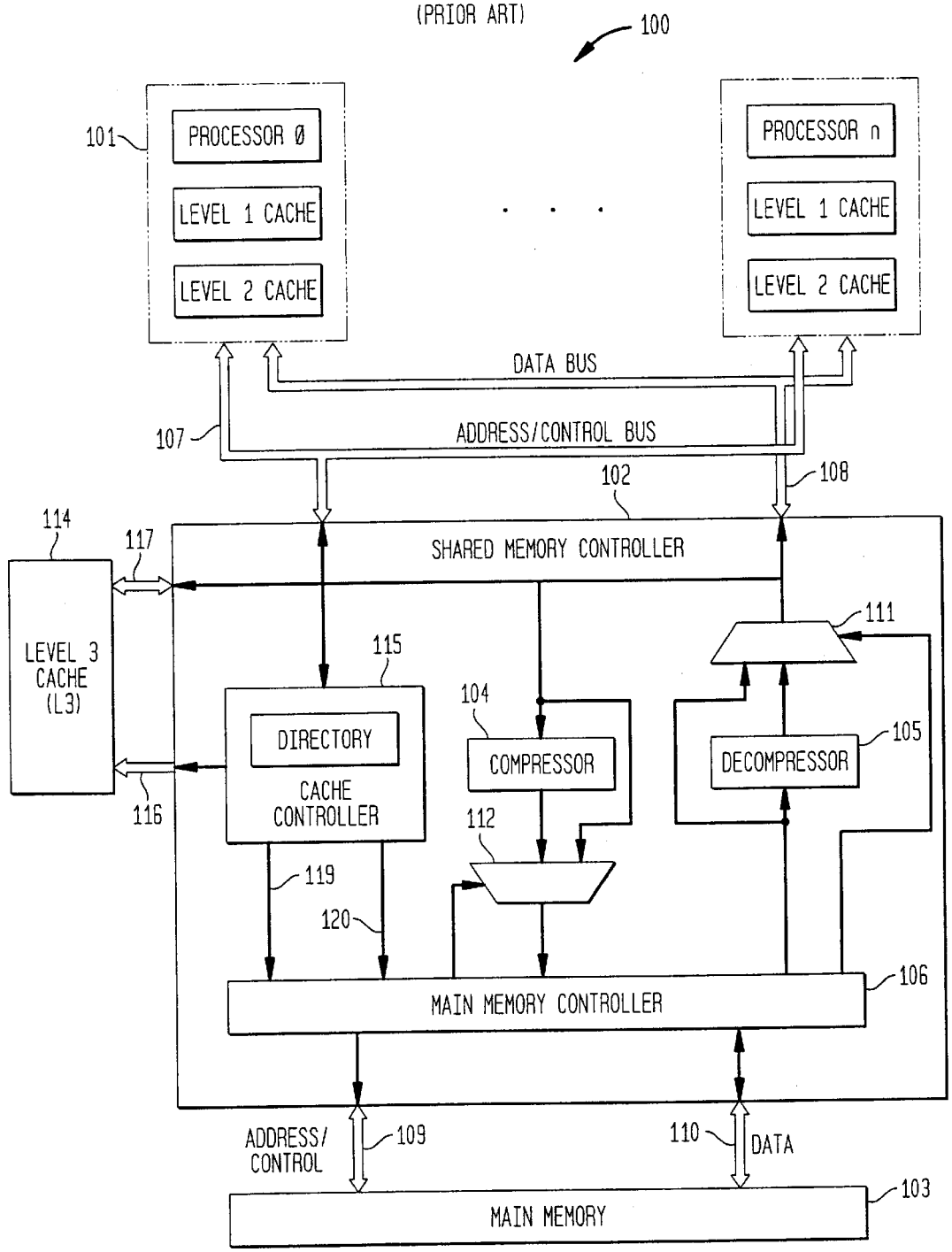
FIG. 1 illustrates a block diagram of a prior art computer having a cache and a main memory system with hardware compressor and decompressor.
Figure 2:
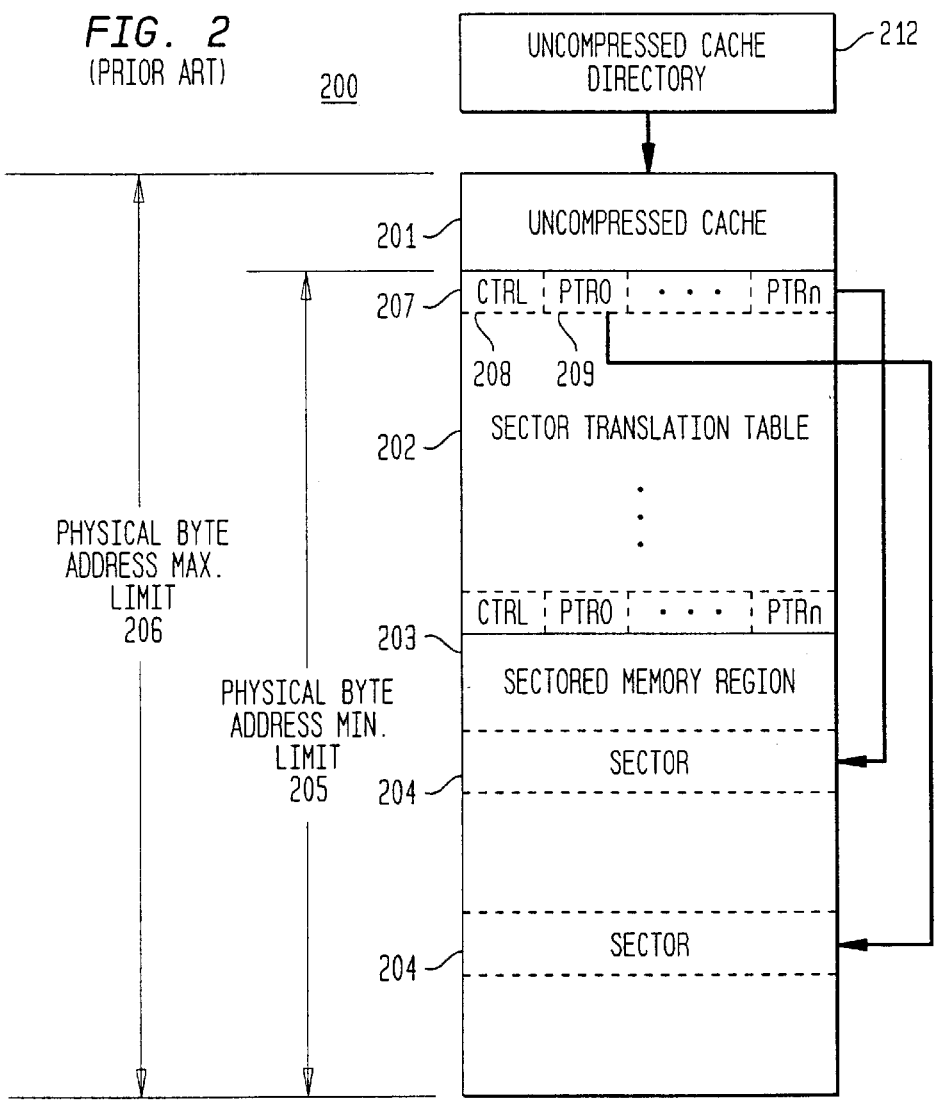
FIG. 2 illustrates a prior art memory address space partitioning scheme.
Figure 3:
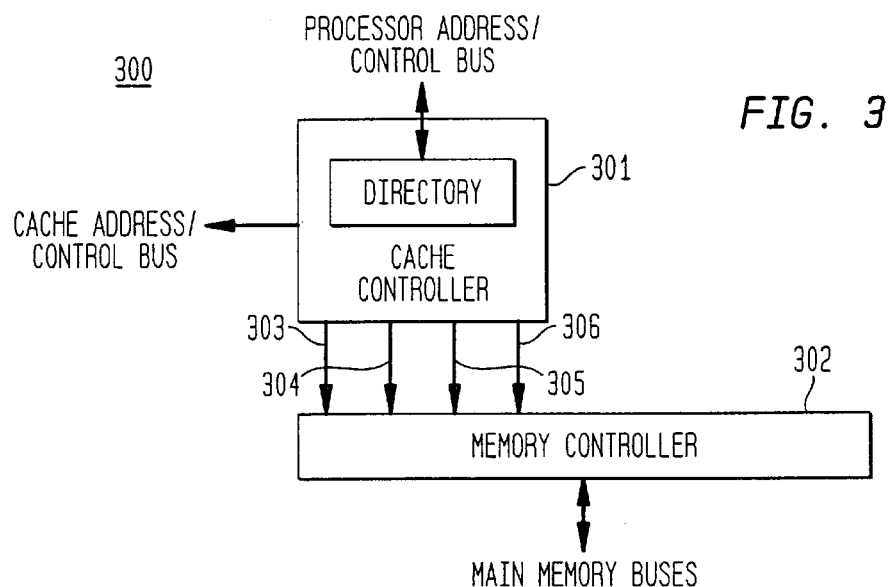
FIG. 3 illustrates the stale compressed memory recycler according to the principals of the present invention.

Referring to FIG. 3, there is shown is an improved apparatus 300 that permits a main memory controller 302 to detect and recover storage associated with "stale" information within the main memory. The memory controller 302 is modified to receive and process two new logic signals from the cache controller device 301: 1) a "read with intent to modify" (RWITM) signal 303; and, 2) "modify" strobe signal 304. These new signals 303,304 are used together with the existing read request 305 and read request address 306 signals, which are themselves used to request a quantity of information for placement in the cache. Under specific circumstances to be explained in greater detail herein, the new signals 303,304 enable the memory controller 302 to set the main memory storage sector requirement, noted within the sector translation table entry selected by the cache line read request address 305, to zero, and release all storage sectors to the free storage sector pool.

In operation, the cache controller 301 asserts the RWITM signal 303 concurrently with the read request 305 together with a valid state on the read request address 306 to the main memory controller, when the new cache line will be initialized to the "modified" state. This situation occurs when the cache controller satisfies a write or a read with intent to modify request that misses the cache.

The modify strobe 304 is asserted for one cycle by the cache controller, together with a valid state on the read request address 306, whenever an existing cache line state changes to the "modified" state and the read request 305 signal is not already asserted. This situation occurs when the cache controller 301 satisfies a write or read with intent to modify request that hits the cache. In accordance with the state diagram of FIG. 4, it should be understood that the system preferably selects service of a cache line read miss request at a higher priority than a cache line read hit with update to modified state.

Referring now to FIG. 4, there is shown a state diagram 400 for controlling read access to the memory with special provisions for detecting and recovering storage associated with "stale" information within the memory depicted as process steps 406 through 410. Initially, the memory controller remains in an idle state until a read request signal 305 or a modify strobe signal 304 is asserted. At such time 402 the read request signal 305 or a modify strobe signal 304 is asserted, the memory controller captures the state of the RWITM signal 303, read request address 306 and read request signal 305 signals into respective registers for later reference. Then, at step 403, the memory controller reads the sector translation table (STT) entry at the location decoded from the read request address register. At step 404, a determination is made as to whether the read request register is set, i.e., the memory controller is servicing a read request. If it is determined that there is a valid read request, then at step 405, the information is read from the main memory located at the valid sector address(es) parsed from the STT entry, and forwarded back to the cache in response the read request. Then, at step 406, a determination of the captured RWITM state is made, i.e., if the RWITM register was set. At step 406, if the RWITM register was not set, i.e. the cache line read will not be initialized to the "modified" state, then service of the read request is complete and the control is returned to the idle state 401. Otherwise, if the RWITM register was set or, if at step 404 it was determined that the read request register was not set, then information contained within any valid sectors indicated in the STT entry are "stale", as the cache controller has signaled that the copy of the information within the cache will be modified. Thus, at step 407, a determination is made as to whether there are any valid sectors indicated in the STT. If, at step 407 there are no valid sectors indicated in the STT (there is no storage to be recovered), then control returns to the "idle" state 401. Otherwise, if there are valid sectors indicated in the STT, then all valid sectors within the STT entry are set as unused or "invalid" at step 408. Then, at step 409, any sector addresses that were invalidated are written to the available sector pool or "free list". Sector addresses included within the "free list" are available for use in storing other information as the need arises at any subsequent time. Then, at step 410, the updated STT entry is written back to the main memory, before control is returned to the idle state.

The preferred embodiment just described represents the lowest cost implementation, without additional queues, buffers or address signals to handle cache line hit state changes while a cache line miss read request is pending. On occasion when these simultaneous events do occur, cache "modified" state changes will be missed by the memory controller, resulting in some "stale" information being left within the memory. In most applications the small amount of unrecovered storage is negligible. However, in applications where this cannot be tolerated, an independent modify address bus can be implemented from the cache controller to the memory controller, to permit simultaneous modify and read requests to occur at independent addresses. Further, a hardware queue structure may be implemented within the memory controller to store a quantity of modify strobe addresses caused by a series of cache hit conditions resulting in "modified" state changes that may occur in rapid succession, at a rate faster than the memory controller could satisfy the requests. The memory controller may then service the requests from the queue during idle periods.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A computer memory system implementing a processing device for enabling indirect storage and retrieval of compressed data in an available address space in a physical memory associated with said computer and issuing real memory addresses for accessing information from said physical memory, said system comprising:
   a sectored storage region in said physical memory for exclusive storage of information in fixed length storage sectors;
   a cache memory array device having a plurality of cache lines;
   a cache directory device, associated with said cache memory array device, comprising entries for storing address tag information and modification state information associated with the data stored in said cache memory array;
   a cache line replacement mechanism associated with said cache memory array, for performing a cache line fill operation by requesting and removing existing cache line data and replacing removed data with different data via a cache line replacement operation, and updating said directory device with new address tag information and modification state information; and,
   a cache memory access system for enabling access to said data in said physical memory by said processing device, the cache memory access system including a cache control mechanism for asserting signals associated with said cache line modification state information when a cache line is to be modified; and,
   a memory control device, responsive to said asserted modified state information signals for reallocating any sectors within said sectored storage region associated with said modified cache line as unused sectors available for subsequent data storage, and maintaining a list comprising addresses of said unused sectors in said physical memory,
   wherein said memory control device accesses said unused sector list for enabling subsequent data storage in said available unused sectors.

2. The computer memory system as claimed in claim 1, wherein said memory control device further updates said unused sector address list as sectors become available.

3. The computer memory system as claimed in claim 1, wherein said cache memory access system is responsive to processor device memory access requests, said signals asserted by said cache control mechanism including one or more of:
   a read request signal that is responsively asserted when a processor device request misses said cache memory array device;
   a modified strobe signal that is responsively asserted when a processor device request hits said cache memory, and results in the establishment of a modified state for a selected cache line existing within said cache memory array device;
   a plurality of address bus signals that are responsively asserted with a processor device request address state for one of: a request associated with a cache miss when a read request is asserted, and, a request associated with a cache hit and the modified strobe signal is asserted and the read request signal is not asserted; and,
   a read-with-intent-to-modify state signal that is responsively asserted, concurrently with said read request signal, when a processor device request misses said cache memory, and results in the establishment of a modified state for a new cache line, whereby combinations of said asserted signals are input to said memory control device for control thereof.

4. The computer memory system as claimed in claim 3, wherein said cache memory access system establishes a modified state for an existing cache line when said processor device issues a cache line read with intent to modify request or a write request that hits a selected cache line without a modified state.

5. The computer memory system as claimed in claim 3, wherein said cache memory access system establishes a modified state for a new cache line when said processor device issues a cache line read with intent to modify request or a write request that misses a selected cache line.

6. The computer memory system as claimed in claim 5, wherein said modified strobe signal is asserted for one machine cycle.

7. In a computer memory system including a processor device having associated physical system memory storage, a sectored storage region in said physical memory for exclusive storage of compressed data in fixed length storage sectors, a cache memory array device having a plurality of cache lines, and, a cache line replacement mechanism associated with said cache memory array for performing cache line read and write operations, a method of recovering storage sectors associated with stale information within said sectored storage comprising the steps of:
   a) asserting one or more signals associated with a cache line read or write operation, said one or more signals including cache line modification state information indicating when a cache line is to be modified;
   b) detecting said asserted one or more signals; and
   c) reallocating any sectors within said sectored storage region associated with a modified cache line as unused sectors available for subsequent data storage;
   d) maintaining a list comprising addresses of said unused sectors in said physical memory; and,
   e) accessing said unused sector list for enabling subsequent data storage in said available unused sectors.

8. The method according to claim 7, wherein prior to step a), the step of receiving a processor device memory access request resulting in a cache line read or write operation, said asserting step a) further comprising one or more steps of:
   responsively asserting a read request signal when said processor device request misses said cache memory array device;
   responsively asserting a modified strobe signal when said processor device request hits said cache memory, and results in establishment of a modified state for a selected cache line existing within said cache memory array device;
   responsively asserting an address bus signal with a processor device request address state when either one of:

a processor device request associated with a cache miss occurs when a read request is asserted, and, a processor device request associated with a cache hit occurs and the modified strobe signal is asserted and the read request signal is not asserted; and, responsively asserting a read-with-intent-to-modify state signal concurrently with said read request signal, when said processor device request misses said cache memory, and results in the establishment of a modified state for a new cache line.

9. The method according to claim 8, wherein said processor device request includes a cache line read with intent to modify request or a write request that hits a selected cache line without a modified state, said asserting step a) further including a step of establishing said modified state for an existing cache line.

10. The method according to claim 8, wherein said processor device request includes a cache line read with intent to modify request or a write request that misses a selected cache line, said asserting step a) fiber including establishing said modified state for a new cache line.

11. The method according to claim 10, wherein said sectored storage region includes a sector translation lookup table (STT) including fixed length entries for mapping said real memory addresses to sector locations within said physical memory, said reallocating step further including the step of:

decoding a read request address for accessing an entry in said STT in response to detecting one of said asserted read request and said modify strobe signals, determining whether said processor request is a read request; and, if said processor request is a read request, servicing said read request by reading said information stored at valid sector addresses.

12. The method according to claim 11, wherein after servicing said read request, the steps of:

determining assertion of said RWITM signal; and if said RWITM signal is asserted, or said processor request is not a read request, setting all sectors addresses within the STT as invalid, and writing the STT entry back to the physical memory.

13. The method according to claim 12, further including the step of updating said unused sector list as sectors become available.

14. A stale compressed memory recycler comprising:

a mechanism for extracting state information in a cache control device provided in a compressed memory system, said state information available at such time a cache line read request or intent to modify request is issued by a processor device;

a device responsive to said extracted state information for servicing said read request from said processor device and determining if said cache line is to be modified, said servicing including reading valid memory sectors in a sectored storage region of said physical memory; and, a device for recovering said sectors in said sectored store region for subsequent use when said cache line is to be modified, said device maintaining a list comprising addresses of said recovered sectors in said physical memory, and accessing said list to enable subsequent data storage in said available unused sectors.

15. The stale compressed memory recycler as claimed in claim 14, wherein said device responsive to said extracted state information further includes implementing priority mechanism for servicing a cache line read miss request prior to servicing than a cache line read hit with intent to modify.

16. The stale compressed memory recycler as claimed in claim 14, wherein said device responsive to said extracted state information further includes a mechanism for determining address locations of sectors within said sectored storage region comprising the information to be read or modified by said processor device.

17. The stale compressed memory recycler as claimed in claim 15, wherein said recovering device includes mechanism for invalidating sector addresses of sectors to be recovered as to make said sector addresses available for subsequent use.

* * * * *